United States Patent
Aoki et al.

(10) Patent No.: US 11,172,556 B2
(45) Date of Patent: Nov. 9, 2021

(54) LIGHT EMITTING ELEMENT DRIVE DEVICE

(71) Applicant: Rohm Co., Ltd., Kyoto (JP)

(72) Inventors: Akira Aoki, Kyoto (JP); Ryo Takagi, Kyoto (JP); Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/886,958

(22) Filed: May 29, 2020

(65) Prior Publication Data

US 2020/0383188 A1 Dec. 3, 2020

(30) Foreign Application Priority Data

Jun. 3, 2019 (JP) .............................. JP2019-103726

(51) Int. Cl.
*H05B 45/345* (2020.01)
*H05B 45/14* (2020.01)
*H05B 45/325* (2020.01)
*H05B 45/3725* (2020.01)

(52) U.S. Cl.
CPC ........... *H05B 45/345* (2020.01); *H05B 45/14* (2020.01); *H05B 45/325* (2020.01); *H05B 45/3725* (2020.01)

(58) Field of Classification Search
CPC .... H05B 45/345; H05B 45/14; H05B 45/325; H05B 45/3725; Y02B 20/30; Y02B 20/40
See application file for complete search history.

(56) References Cited

U.S. PATENT DOCUMENTS

2015/0061615 A1* 3/2015 Michishita .......... H02M 3/1588
                                                                323/271
2018/0178710 A1* 6/2018 Ichikawa ............... H05B 45/10
2018/0294734 A1* 10/2018 Song ..................... H02M 1/083

FOREIGN PATENT DOCUMENTS

JP        2013-089570         5/2013

* cited by examiner

Primary Examiner — Raymond R Chai
(74) Attorney, Agent, or Firm — Fish & Richardson P.C.

(57) ABSTRACT

A light emitting element drive device generates a single output current while switching a target current value for each of a plurality of light emitting elements, and supplies the single output current to the plurality of light emitting elements in a time division manner.

10 Claims, 16 Drawing Sheets

LIGHT EMITTING ELEMENT DRIVE DEVICE

CROSS-REFERENCE TO RELATED APPLICATION

This application is based upon and claims the benefit of priority from Japanese Patent Application No. 2019-103726, filed on Jun. 3, 2019, the entire contents of which are incorporated herein by reference.

TECHNICAL FIELD

The present disclosure relates to a light emitting element drive device (LED driver IC or the like) that drives a light emitting element such as an LED [Light Emitting Diode].

BACKGROUND

FIG. 19 is a view showing a conventional example of an LED light emitting device. An LED light emitting device 201 of the conventional example has two LED driver ICs 211 and 221 in order to individually dim an LED array 213 and an LED 223, respectively, connected in parallel to each other in accordance with dimming signals S21 and S22 input from an MCU [Micro Controller Unit] 202.

FIG. 20 is a view showing output currents Io1 and Io2 supplied to the LED array 213 and the LED 223, respectively, and output voltages Vo1 and Vo2. As shown in FIG. 20, the output currents Io1 and Io2 are adjusted to respective target current values I1 and I2 (constant values) by a continuous constant current control. At this time, the output voltages Vo1 and Vo2 match forward drop voltages VF1 and VF2 of the LED array 213 and the LED 223, respectively.

In the above-described conventional LED light emitting device 201, it is necessary to provide the LED driver ICs 211 and 221 for the LED array 213 and the LED 223, respectively, which causes an increase in the number of components (an increase in not only the number of LED driver ICs 211 and 221, but also including DC/DC components 212 and 222 externally attached to the LED drive ICS 211 and 221, respectively, or extension of harnesses).

SUMMARY

Some embodiments of the present disclosure provide a light emitting element drive device capable of individually dimming a plurality of light emitting elements with a small number of components.

The present disclosure provides a light emitting element drive device that generates a single output current while switching a target current value for each of a plurality of light emitting elements and supplies the single output current to the plurality of light emitting elements in a time division manner (a first configuration).

The light emitting element drive device of the first configuration may perform an output feedback control of the output current by a hysteresis control method (a second configuration).

The light emitting element drive device of the first configuration may perform an output feedback control of the output current by a bottom detection on-time fixed method (a third configuration The light emitting element drive device of the third configuration may include: a current controller configured to output a pulse of a set signal when detecting a bottom of the output current; an on-time setter configured to output a pulse of a reset signal when an on-time has elapsed from the pulse output of the set signal; and a switch driver configured to generate the output current by driving a switch output stage according to the set signal and the reset signal (a fourth configuration).

In the light emitting element drive device of the fourth configuration, the current controller may include a comparator configured to compare a slope voltage according to an inductor current flowing in an off-period of the switch output stage with a threshold voltage that is switched for each of the plurality of light emitting elements to generate the set signal (a fifth configuration).

In the light emitting element drive device of the fifth configuration, the current controller may perform an adjustment control of the threshold voltage so as to stabilize an average value of the output current at the target current value (a sixth configuration).

In the light emitting element drive device of the sixth configuration, the current controller may further include: an error amplifier configured to amplify a difference between a sense voltage according to the output current and a predetermined dimming voltage to generate an error signal; a dimming voltage switcher configured to switch the dimming voltage for each of the plurality of light emitting elements; and a threshold voltage generator configured to generate a plurality of integrated voltages by integrating the error signal in a sequentially distributed manner while switching a plurality of integrators connected to a subsequent stage of the error amplifier in synchronization with a switching control of the dimming voltage, and configure to output one of the plurality of integrated voltages as the threshold voltage (a seventh configuration).

In the light emitting element drive device of the sixth configuration, the current controller may further include: a plurality of error amplifiers configured to amplify differences between a sense voltage according to the output current and a plurality of dimming voltages, respectively, to generate a plurality of error signals; and a threshold voltage generator configured to generate a plurality of integrated voltages by integrating the plurality of error signals in parallel using a plurality of integrators connected to subsequent stages of the plurality of error amplifiers, respectively, and configured to output one of the plurality of integrated voltages as the threshold voltage (an eighth configuration).

In the light emitting element drive device of the third to eighth configurations, the on-time may be a variable value proportional to an output voltage applied to the plurality of light emitting elements (a ninth configuration).

The present disclosure provides a light emitting device including: the light emitting element drive device of the first to ninth configurations; and a plurality of light emitting elements driven by the light emitting element drive device (a tenth configuration).

In the light emitting device of the tenth configuration, the light emitting element may be a light emitting diode or a light emitting diode array, or an organic EL [electro-luminescence] element or an organic EL element array (an eleventh configuration).

The present disclosure provides a vehicle including the light emitting device of the tenth or eleventh configuration as an exterior lamp (a twelfth configuration).

DETAILED DESCRIPTION

First Embodiment

Figure 1:
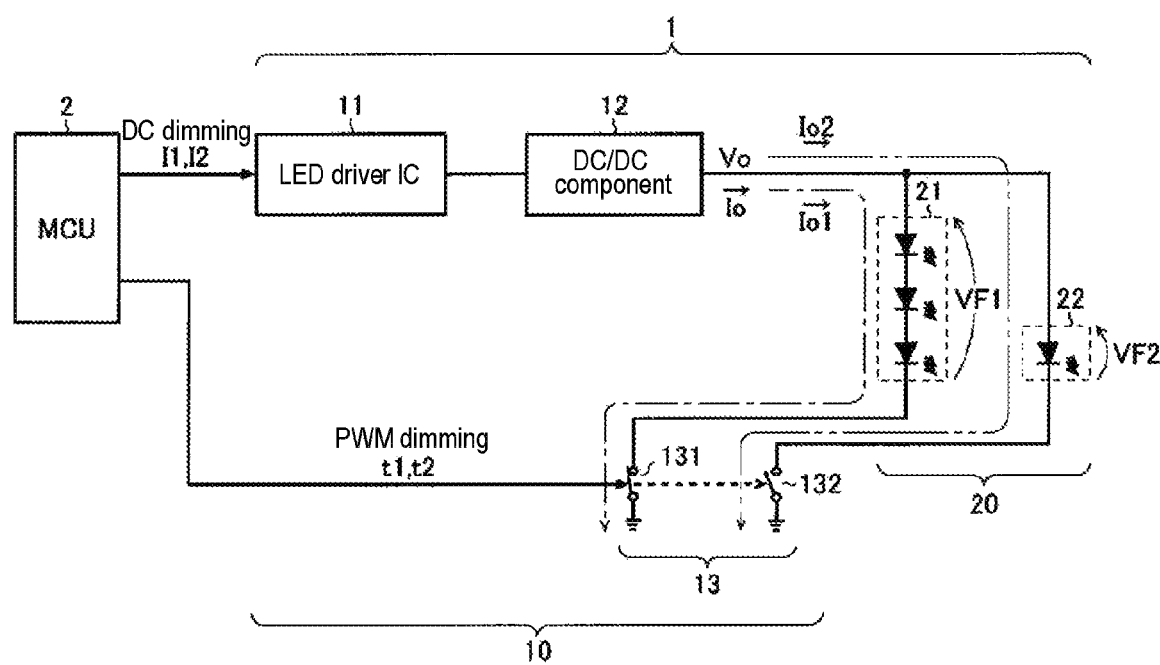
FIG. 1 is a view showing an LED light emitting device according to a first embodiment.

FIG. 1 is a view showing an LED light emitting device according to a first embodiment. An LED light emitting device 1 of the present embodiment includes an LED controller 10 and an LED light emitter 20. The LED light emitter 20 includes an LED array 21 (three stages in series in FIG. 1) and an LED 22, which are connected in parallel with each other. Forward drop voltages of the LED array 21 and the LED 22 are assumed to be VF1 and VF2 (where VF1>VF2), respectively.

The LED controller 10 is a main control part for individually dimming the LED array 21 and the LED 22 according to a dimming signal (DC [direct current] dimming and PWM [pulse width modulation] dimming) input from an MCU 2, and includes an LED driver IC 11, a DC/DC component 12, and a time division controller 13.

The LED driver IC 11 constitutes a DC/DC converter together with the DC/DC components 12 (an inductor, a capacitor, a resistor, an output transistor, a synchronous rectification transistor, and the like) externally attached to the LED driver IC 11, and generates an output current Io and an output voltage Vo and supplies them to the LED light emitter 20. In particular, the LED driver IC 11 has a function of stabilizing output currents Io1 and Io2, which are supplied to the LED array 21 and the LED 22 in a time divisional manner, respectively, to respective target current values I1 and I2 according to a dimming signal (DC dimming) input from the MCU 2.

The time division controller 13 includes a switch 131 and a switch 132, which are connected in series to the LED array 21 and the LED 22, respectively, and performs a time division control (or a time sharing control) of the LED array 21 and the LED 22 by switching the switches 131 and 132 on and off at a predetermined PWM cycle Tpwm (for example, 2.5 ms) according to a dimming signal (PWM dimming) input from the MCU 2. The switches 131 and 132 may be built in the LED driver IC 11. In addition, the switches 131 and 132 may be provided on an upstream side (anode side) of the LED array 21 and the LED 22, instead of a downstream side (cathode side) thereof.

Figure 2:
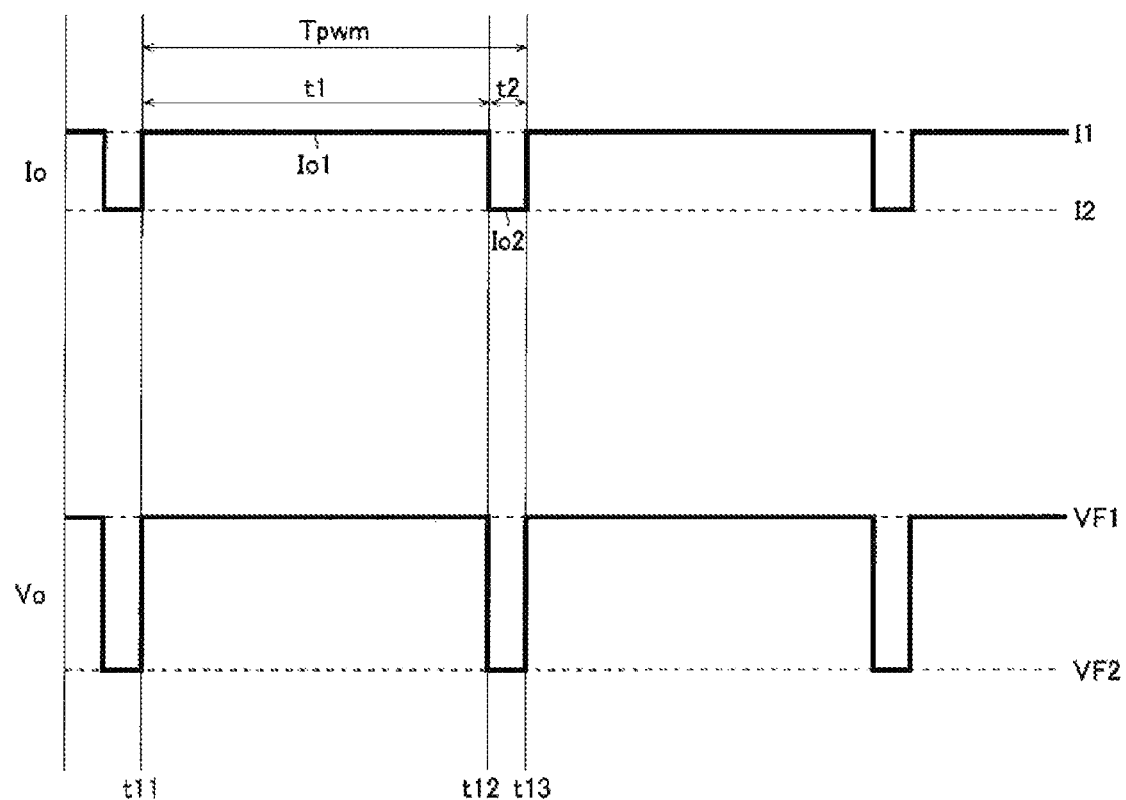
FIG. 2 is a view showing an example of a time division control and a current stabilization control in the first embodiment.

FIG. 2 is a view showing an example of a time division control and a current stabilization control in the first embodiment, and depicts the output current Io and the output voltage Vo in order from the top.

As described earlier, the time division controller 13 performs a time division control of the LED array 21 and the LED 22 by switching the switches 131 and 132 on and off at the PWM cycle Tpwm.

Specifically, referring to FIG. 2, during a period t1 (=time t11 to t12) in which the switch 131 is switched on and the switch 132 is switched off, since the output current Io1 (=Io) flows only into the LED array 21, the LED array 21 is turned on and the LED 22 is turned off. That is, an on-duty Don1 of the output current Io1 is Don1=t1/Tpwm. In the period t1, the output voltage Vo matches the forward drop voltage VF1 of the LED array 21.

On the other hand, during a period t2 (=time t12 to t13) in which the switch 131 is switched off and the switch 132 is switched on, since the output current Io2 (=Io) flows only into the LED 22, the LED array 21 is turned off and the LED 22 is turned on. That is, an on-duty Don2 of the output current Io2 is Don2=t2/Tpwm (where Don1+Don2<1). In the period t2, the output voltage Vo matches the forward drop voltage VF2 of the LED 22.

During the time division control described above, the output currents Io1 and Io2 are adjusted to the respective target current values I1 and I2 (constant values) by the current stabilization control of the LED driver IC 11. That is, the LED driver IC 11 generates a single output current Io while switching the target current values I1 and I2 for the LED array 21 and the LED 22, respectively, and supplies the single output current Io as the output currents Io1 and Io2 to the LED array 21 and the LED 22 in a time division manner.

The brightness of the LED array 21 can be arbitrarily adjusted according to the target current value I1 and the on-duty Don1 of the output current Io1. The brightness of the LED 22 can be arbitrarily adjusted according to the target current value I2 and the on-duty Don2 of the output current Io2.

Figure 19:
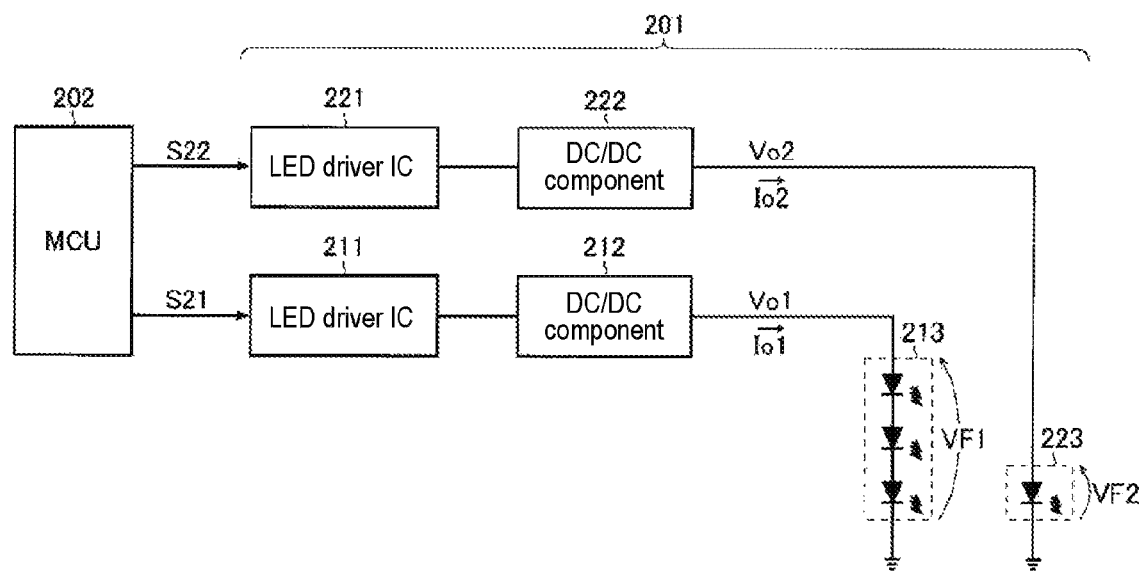
FIG. 19 is a view showing an example of a conventional LED light emitting device.
Figure 20:
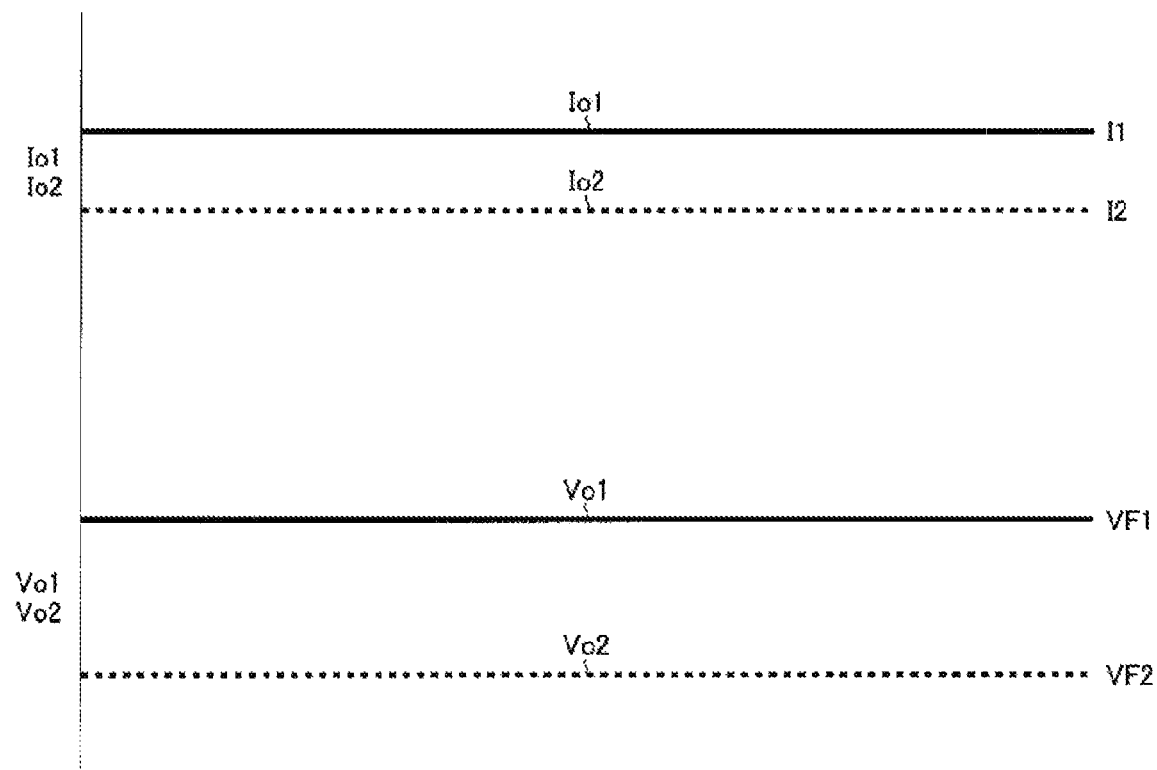
FIG. 20 is a view showing output currents supplied to LEDs and output voltages.

As described above, according to the present embodiment, unlike the above-described conventional configuration (FIG. 19), it is not necessary to provide a plurality of LED driver ICs (and DC/DC components externally attached to the LED driver ICs and harnesses) for each of the LED array 21 and the LED 22. Thus, it is possible to individually dim the LED array 21 and the LED 22 with a significantly reduced number of components as compared with the conventional configuration.

The LED array 21 and the LED 22 are alternately turned on and off when viewed microscopically. However, when a switching cycle Tsw is sufficiently short, the LED array 21 and the LED 22 appear to be simultaneously turned on to the naked human eye.

In particular, the present embodiment can be suitably used in a case where a difference in brightness is required between the LED array 21 and the LED 22.

In addition, in the present embodiment, although the time division control of two channels is taken as an example, the present embodiment can also be applied to a time division control of three or more channels.

<Consideration of Output Feedback Control>

Figure 3:
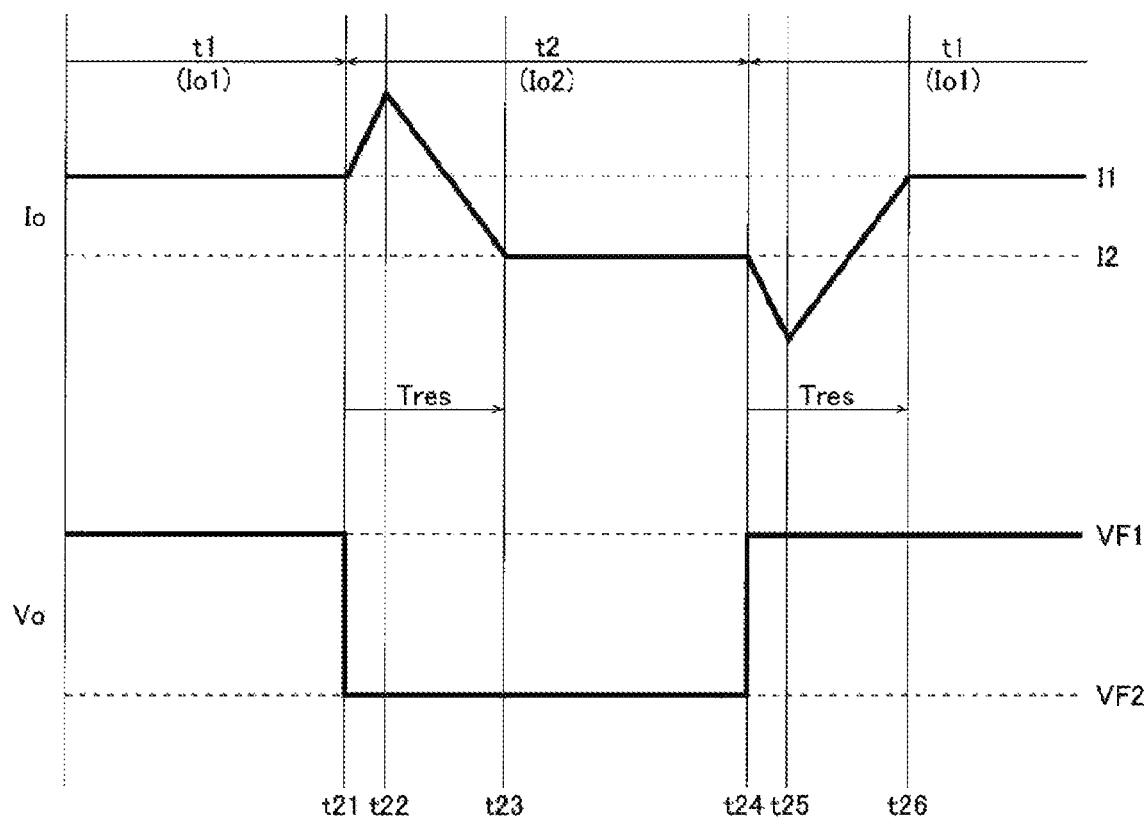
FIG. 3 is a view showing an example of an output feedback control by an error amplifier control method.

Next, an output feedback control of the output current Io is considered. FIG. 3 is a view showing an example of an output feedback control by an error amplifier control method, and depicts the output current Io and the output voltage Vo in order from the top. Periods before time t21 and after time t24 correspond to the above-mentioned period t1 (=the period in which the output current Io (=Io1) is supplied only to the LED array 21). In addition, a period from time t21 to time t24 corresponds to the above-mentioned period t2 (=the period in which the output current Io (=Io2) is supplied only to the LED 22).

In the error amplifier control method (for example, a method in which an error signal between the output current Io and the target current value is generated using an error amplifier, and an on-duty of the DC/DC converter is controlled in a PWM manner according to a result of the comparison between the error signal and a slope signal), it is necessary to connect a high-capacity (10 μF or more) output capacitor to an output terminal of the DC/DC converter. Therefore, when a rapid change in the number of lights (and thus a sudden change in the forward drop voltage appearing as the output voltage Vo) occurs during the time division control of the LED array 21 and the LED 22, a rush current may flow in the output capacitor and the output current Io may transiently enter an overcurrent state (overshoot) or a reduced current state (undershoot).

Referring to FIG. 3, in a period from time t21 to time t22, the output current Io (=Io2) is in an overcurrent state (=a state in which the output current Io is larger than the target current value I1) according to the rapid change in the number of lights from the LED array 21 to the LED 22 (Vo=VF1→VF2). On the other hand, in a period from time t24 to t25, the output current Io (=Io1) is in a reduced current state (=a state in which the output current Io is smaller than the target current value I2) according to the rapid change in the number of lights from the LED 22 to the LED array 21 (Vo=VF2→VF1).

In addition, in the error amplifier control method, it is necessary to set frequency characteristics of the error amplifier to a value (1/20 or less) sufficiently lower than a switching frequency fsw (for example, 400 KHz) of the DC/DC converter in order to secure a phase margin of an output feedback loop. Therefore, a responsiveness of the output current Io during the switching control of the target current values I1 and I2 is limited.

Referring to FIG. 3, since a predetermined response period Tres (=a period from time t21 to time t23) is required to switch the output current Io from the target current value I1 to the target current value I2, an average current value of the output current Io (=Io2) during a period t2 greatly deviates from the target current value I2. In addition, when the output current Io is switched from the target current value I2 to the target current value I1, since the same response period Tres (=a period from time t24 to time t26)

is required, an average current value of the output current Io (=Io1) during a period t1 greatly deviates from the target current value I1.

As described above, when the feedback control of the output current Io is performed by the error amplifier control method, the number of lights of the LED light emitter 20 cannot be switched at a high speed.

Figure 4:
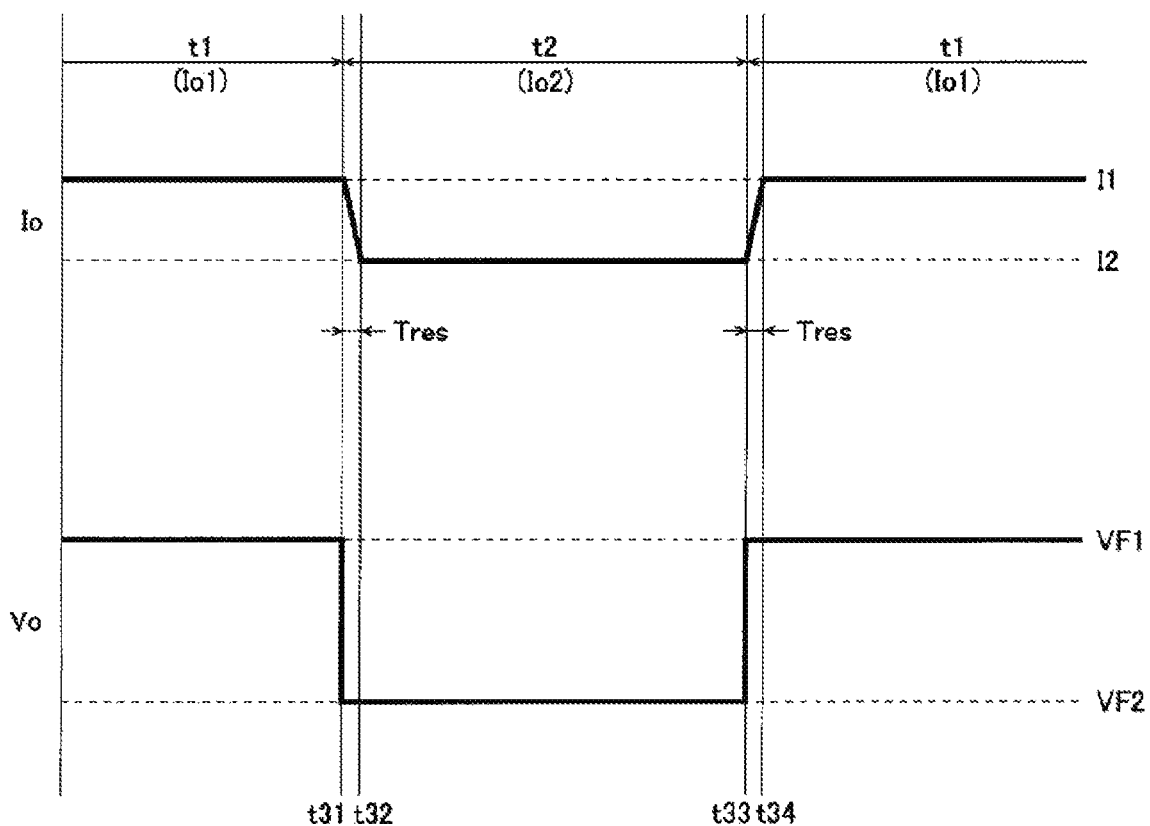
FIG. 4 is a view showing an example of an output feedback control by a hysteresis control method.

FIG. 4 is a view showing an example of an output feedback control by a hysteresis control method, and depicts the output current Io and the output voltage Vo in order from the top. Periods before time t31 and after time t33 correspond to the above-mentioned period t1 (=the period in which the output current Io (=Io1) is supplied only to the LED array 21). In addition, a period from time t31 to time t33 corresponds to the above-mentioned period t2 (=the period in which the output current Io (=Io2) is supplied only to the LED 22).

In the hysteresis control method (for example, a method in which peak detection and bottom detection of the output current Io is performed using a comparator and on and off of the DC/DC converter is controlled according to the detection result), as compared to the above-described error amplifier control method, an output capacitor having a smaller capacity can be used. Therefore, even when the number of lights changes at a high speed during the time division control of the LED array 21 and the LED 22, a relatively large rush current does not flow, and the output current Io is unlikely to enter the overcurrent state or the reduced current state.

Referring to FIG. 4, at time t31, the output current Io (=Io2) is not in the overcurrent state even when a rapid change occurs in the number of lights from the LED array 21 to the LED 22 (Vo=VF1→VF2). Similarly, at time t33, the output current Io (=Io1) is not in the reduced current state even when a rapid change occurs in the number of lights from the LED 22 to the LED array 21 (Vo=VF2→VF1).

In addition, in the hysteresis control method, since phase compensation of the output feedback loop is unnecessary, the responsiveness of the output current Io during the switching control between the target current values I1 and I2 can be improved.

Referring to FIG. 4, the response time Tres (=a period from time t31 to time t32) when the output current Io is switched from the target current value I1 to the target current value I2 is significantly shorter than that of the above-described error amplifier control method. Therefore, deviation between an average current value of the output current Io (=Io2) and the target current value I2 in the period t2 can be suppressed to be small. In addition, since the response time Tres (=a period from time t33 to time t34) when the output current Io is switched from the target current value I2 to the target current value I1 is also significantly shortened, deviation between an average current value of the output current Io (=Io1) and the target current value I1 in the period t1 can be suppressed to be small.

As described above, when the feedback control of the output current Io is performed by the hysteresis control method, the number of lights of the LED light emitter 20 can be switched at a high speed.

Figure 5:
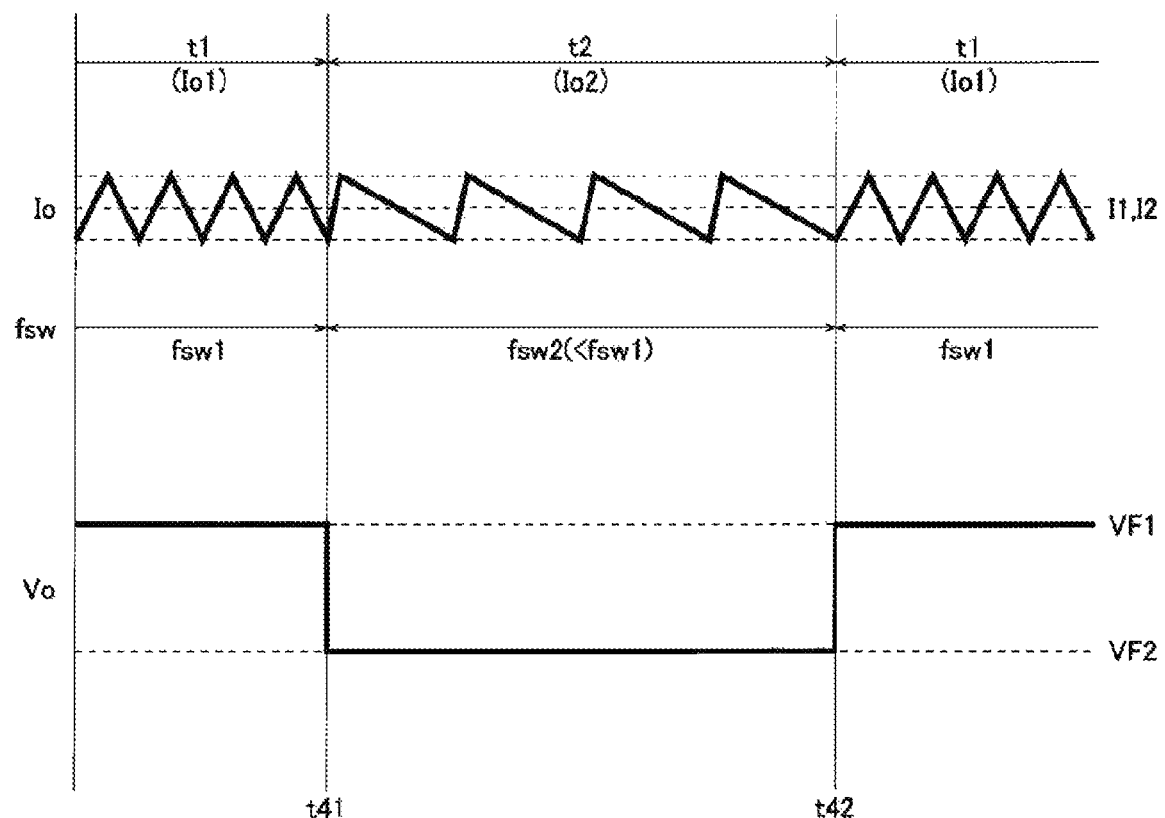
FIG. 5 is a view showing a problem (frequency fluctuation) of the hysteresis control method.

FIG. 5 is a view showing a problem (frequency fluctuation) of the hysteresis control method, and depicts the output current Io, the switching frequency fsw of the DC/DC converter, and the output voltage Vo in order from the top. Periods before time t41 and after time t42 correspond to the above-described period t1 (=the period in which the output current Io (=Io1) is supplied only to the LED array 21). On the other hand, a period from time t41 to time t42 corresponds to the above-described period t2 (=the period in which the output current Io (=Io2) is supplied only to the LED 22). In addition, in FIG. 5, for convenience of illustration, it is assumed that the target current values I1 and I2 in the periods t1 and t2, respectively, coincide with each other.

In the hysteresis control method, when the peak value and the bottom value of the output current Io (and thus a ripple amplitude of the output current Io) are fixed values, the switching frequency fsw of the DC/DC converter fluctuates with the change in the number of lights during the time division control (and thus the fluctuation in the forward drop voltage appearing as the output voltage Vo).

Referring to FIG. 5, at time t41, when the number of lights changes from the LED array 21 to the LED 22 (Vo=VF1→VF2), the switching frequency fsw decreases from fsw1 to fsw2 (<fsw1). Conversely, at time t42, when the number of lights changes from the LED 22 to the LED array 21 (Vo=VF2→VF1), the switching frequency fsw increases from fsw2 to fsw1.

When the switching frequency fsw fluctuates as described above, since the peak frequency of the EMC [Electro-Magnetic Compatibility] noise is polarized, it becomes difficult to take EMC countermeasures.

Figure 6:
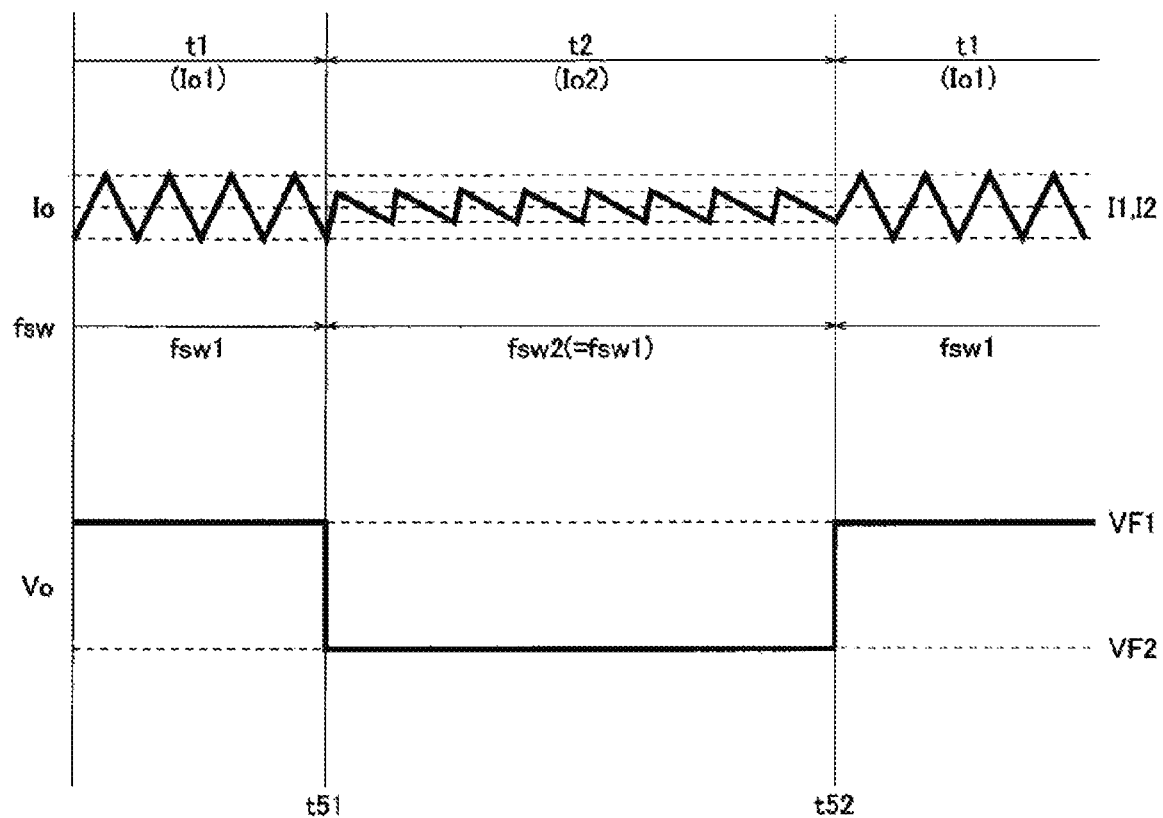
FIG. 6 is a view showing an example of a frequency stabilization control.

FIG. 6 is a view showing an example of a frequency stabilization control in the hysteresis control method, and depicts the output current Io, the switching frequency fsw of the DC/DC converter, and the output voltage Vo in order from the top. Periods before time t51 and after time t52 correspond to the above-described period t1 (=the period in which the output current Io (=Io1) is supplied only to the LED array 21). On the other hand, a period from time t51 to time t52 corresponds to the above-described period t2 (=the period in which the output current Io (=Io2) is supplied only to the LED 22). In addition, in FIG. 6, it is assumed that the target current values I1 and I2 in the periods t1 and t2, respectively, coincide with each other as in FIG. 5 described above.

In the hysteresis control method, when the peak value and the bottom value of the output current Io (and thus the ripple amplitude of the output current Io) are set to variable values, the switching frequency fsw of the DC/DC converter can be stabilized to a constant value even when the number of lights during the time division control changes (and thus the fluctuation in the forward drop voltage appearing as the output voltage Vo).

Referring to FIG. 6, at time t51, when the number of lights changes from the LED array 21 to the LED 22 (Vo=VF1→VF2), the ripple amplitude is narrowed by lowering the peak value and raising the bottom value of the output current Io (=Io2). Conversely, at time t52, when the number of lights changes from the LED 22 to the LED array 21 (Vo=VF2→VF1), the ripple amplitude is expanded by raising the peak value and lowering the bottom value of the output current Io (=Io1). As a result, the switching frequencies fw1 and fw2 in the periods t1 and t2, respectively, are stabilized to a constant value, thereby facilitating EMC countermeasures.

Second Embodiment

Figure 7:
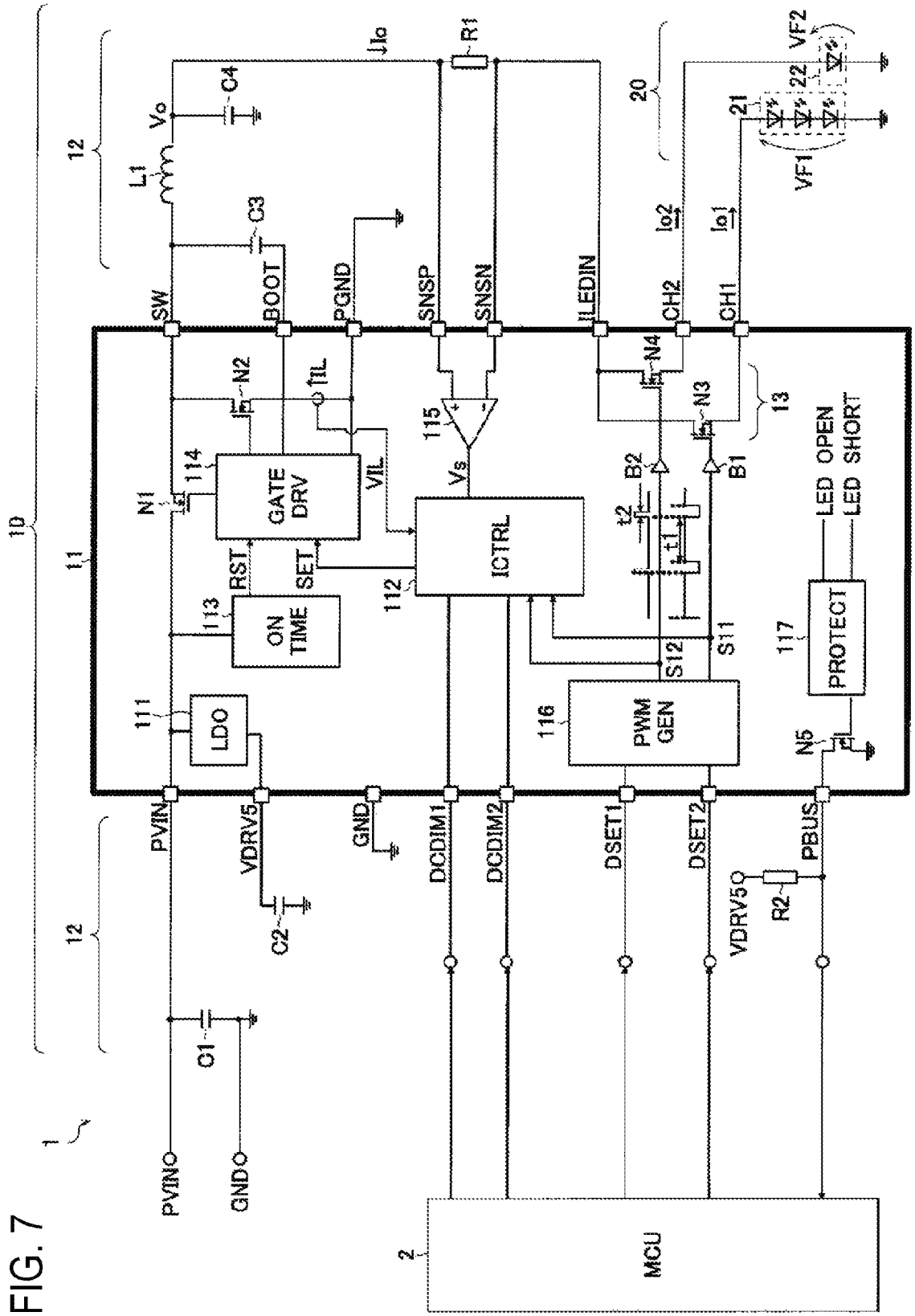
FIG. 7 is a view showing an LED light emitting device according to a second embodiment.

FIG. 7 is a view showing an LED light emitting device according to a second embodiment. In the LED light emitting device 1 of the present embodiment, the LED driver IC 11 and the DC/DC component 12 are more specifically exemplified based on the above-described first embodiment (FIG. 1).

The LED driver IC 11 is a silicon monolithic integrated circuit that is a main control part of the LED controller 10, and has sixteen external terminals (a PVIN pin, a VDRV5 pin, a GND pin, a DCDIM1 pin, a DCDIM2 pin, a DSET1 pin, a DSET2 pin, a PBUS pin, an SW pin, a BOOT pin, a PGND pin, an SNSP pin, an SNSN pin, an ILEDIN pin, a CH2 pin, and a CH1 pin) to establish electrical connections with the outside.

The PVIN pin is a power input terminal. The VDRV5 pin is an internal reference voltage output terminal. The GND pin is a ground terminal. The DCDIM1 pin and the DCDIM2 pin are DC dimming input terminals (1ch/2ch), respectively. The DSET1 pin and the DSET2 pin are PWM dimming input terminals (1ch/2ch), respectively. The PBUS pin is a protect bus signal output terminal. The SW pin is a switching output terminal. The BOOT pin is an external bootstrap capacitor connection terminal for a driver power supply of an upper layer. The PGND pin is a power system ground terminal. The SNSP pin is an output current detection input terminal (+). The SNSN pin is an output current detection input terminal (−). The ILEDIN pin is an output current input terminal. The CH1 pin and the CH2 pin are LED connection terminals (1ch/2ch).

As a package of the LED driver IC 11, for example, an HTSSOP [heat-sink thin shrink small outline package] having a back surface heat dissipation pad may be used.

In addition to the MCU 2 and the LED light emitter 20 (the LED array 21 and the LED 22), the LED driver IC 11 includes various DC/DC components 12 (capacitors C1 to C4, resistors R1 and R2, and an inductor L1) externally attached to the LED driver IC 11.

First, the external connection of the LED driver IC 11 will be described. The PVIN pin is connected to an application terminal of an input voltage PVIN and a first end of the capacitor C1. A second end of the capacitor C1 is connected to the ground terminal. The VDRV5 pin is connected to a first end of the capacitor C2. A second end of the capacitor C2 is connected to the ground terminal. The GND pin is connected to the ground terminal. The DCDIM1 pin and the DCDIM2 pin, the DSET1 pin and the DSET2 pin, and the PBUS pin are respectively connected to the MCU 2. The PBUS pin is pulled up to the VDRV5 pin via the resistor R2.

The SW pin is connected to a first end of the inductor L1 and a first end of the capacitor C3. The BOOT pin is connected to a second end of the capacitor C3. A second end of the inductor L1 is connected to a first end of the capacitor C4 (=an output terminal of the output voltage Vo). A second end of the capacitor C4 and the PGND pin are both connected to the ground terminal. The SNSP pin is connected to an application terminal of the output voltage Vo together with a first end of the resistor R1. The SNSN pin and the ILEDIN pin are both connected to a second end of the resistor R1. The CH1 pin is connected to the anode of the LED array 21. The CH2 pin is connected to the anode of the LED 22. The cathodes of the LED array 21 and the LED 22 are both connected to the ground terminal.

In the DC/DC components 12, the inductor L1 and the capacitors C3 and C4 form a bootstrap type buck switch output stage together with N-channel type MOS [Metal Oxide Semiconductor] field effect transistors N1 and N2 built in the LED driver IC 11. The resistor R1 functions as a shunt resistor (=a sense resistor) that converts the output current Io into a voltage signal (=Io×R1).

<LED Driver IC>

Next, the internal configuration of the LED driver IC 11 will be described with reference to FIG. 7. The LED driver IC 11 is formed by integrating a reference voltage generator

111, a current controller 112, an on-time setter 113, a gate driver 114, a current sense amplifier 115, a PWM dimming signal generator 116, an abnormality protector 117, buffers B1 and B2, and N-channel MOS field effect transistors N1 to N5. Of course, the LED driver IC 11 may be integrated with components and functional blocks (UVLO [Under Voltage Locked-Out], TSD [Thermal Shut Down], and the like) other than those described above.

The reference voltage generator 111 generates a predetermined reference voltage VDRV5 (for example, 5 V) from the input voltage PVIN (for example, 5 to 40 V) and outputs the reference voltage VDRV5 to the VDRV5 pin. For example, an LDO [Low Drop-Out] regulator may be used as the reference voltage generator 111.

The current controller 112 outputs a pulse of a set signal SET when detecting the bottom of the output current Io. The current controller 112 receives inputs of DC dimming signals DCDIM1 and DCDIM2, PWM dimming signals S11 and S12, a sense voltage Vs, and a slope voltage VIL, and outputs the pulse of the set signal SET. The internal configuration and operation of the current controller 112 will be described in detail later.

The on-time setter 113 outputs a pulse of a reset signal RST when an on-time Ton has elapsed from the pulse output of the set signal SET. In some embodiments, the on-time Ton may be a variable value (Ton∝SNSN/PVIN), which is proportional to the output voltage Vo (in particular, an SNSN pin voltage applied to the LED light emitter 20) and is inversely proportional to the input voltage PVIN. The technical significance of setting the on-time Ton to the variable value will be described in detail later.

The gate driver 114 includes an upper gate driver that drives the gate of the transistor N1 and a lower gate driver that drives the gate of the transistor N2 (both not shown). By driving a switch output stage (in particular, the transistors N1 and N2) according to the set signal SET and the reset signal RST, the gate driver 114 generates the output current Io and the output voltage Vo (for example, 2 to 15 V). Specifically, the gate driver 114 turns the transistor N1 on and turns the transistor N2 off at a pulse output timing of the set signal SET, while turning the transistor N1 off and turning the transistor N2 on at a pulse output timing of the reset signal RST.

As described above, the transistors N1 and N2 are complementarily turned on and off. However, the term "complementarily" in the present disclosure should be broadly interpreted as including not only a case where the on and off states of the transistors N1 and N2 are completely reversed, but also a case where a simultaneous off time (so-called dead time) of the transistors N1 and N2 for preventing a through current is provided.

The current sense amplifier 115 generates the sense voltage Vs according to a voltage (=a voltage across the resistor R1 (=Io×R1)) between terminals of the SNSP pin and the SNSN pin. The sense voltage Vs increases as the output current Io increases, whereas the sense voltage Vs decreases as the output current Io decreases.

The PWM dimming signal generator 116 receives inputs of pulse width setting signals DSET1 and DSET2, and generates the PWM dimming signals S11 and S12. The PWM dimming signals S11 and S12 are pulse signals that are pulse-width modulated with a common PWM cycle Tpwm.

Specifically, in the PWM cycle Tpwm, the PWM dimming signal S11 becomes a high level during an on-period t1 (=corresponding to the above-described period t1 when the LED array 21 is turned on), which is set based on the pulse width setting signal DSET1, and becomes a low level during the remaining off-period. On the other hand, in the PWM cycle Tpwm, the PWM dimming signal S12 becomes a high level during an on-period t2 (=corresponding to the above-described period t2 when the LED 22 is turned on), which is set based on the pulse width setting signal DSET2, and becomes a low level during the remaining off-period.

Here, the PWM dimming signal generator 116 sets the on-periods t1 and t2 so that both the PWM dimming signals S11 and S12 do not become a high level at the same time. That is, the on-period t2 of the PWM dimming signal S12 is set to overlap with the off-period (=Tpwm-t1) of the PWM dimming signal S11. Therefore, the on-periods t1 and t2 necessarily satisfy t1+t2<Tpwm.

Alternatively, the PWM dimming signal generator 116 may be omitted, and the PWM dimming signals S11 and S12 may be externally input from the MCU 2.

The abnormality protector 117 performs an on and off control of the transistor N5 in order to notify the MCU 2 of an abnormality (for example, LED open or LED short) of the LED driver IC 11.

The buffers B1 and B2 receive the inputs of the PWM dimming signals S11 and S12 generated by the PWM dimming signal generator 116, respectively, and drive the gates of the transistors N3 and N4, respectively.

The transistor N1 corresponds to an output switch of the switch output stage. The drain of the transistor N1 is connected to the PVIN pin. The source and the back gate of the transistor N1 are connected to the SW pin. The transistor N1 is turned on when a gate signal input from the gate driver 114 is at a high level, and is turned off when the gate signal is at a low level.

The transistor N2 corresponds to a synchronous rectification switch of the switch output stage. The drain of the transistor N2 is connected to the SW pin. The source and the back gate of the transistor N2 are connected to the PGND pin. The transistor N2 is turned on when a gate signal input from the gate driver 114 is at a high level, and is turned off when the gate signal is at a low level.

However, a rectification method of the switch output stage is not necessarily limited to the synchronous rectification method, but a diode rectification method (=an asynchronous rectification method) may be adopted. In that case, the transistor N2 may be replaced with a diode (for example, a Schottky barrier diode).

The transistors N3 and N4 correspond to the above-described time division controller 13 (in particular, the switches 131 and 132). The drains of the transistors N3 and N4 are both connected to the ILEDIN pin. The source and the back gate of the transistor N3 are connected to the CH1 pin. The source and the back gate of the transistor N4 are connected to the CH2 pin.

The transistor N3 is turned on when the PWM dimming signal S11 input to the gate via the buffer B1 is at a high level, and is turned off when the PWM dimming signal S11 is at a low level. The transistor N4 is turned on when the PWM dimming signal S12 input to the gate via the buffer B2 is at a high level, and is turned off when the PWM dimming signal S12 is at a low level.

For example, when the transistor N3 is turned on and the transistor N4 is turned off, the output current Io1 (=Io) flows only in the LED array 21, so that the LED array 21 is turned on and the LED 22 is turned off. On the other hand, when the transistor N3 is turned off and the transistor N4 is turned on, the output current Io2 (=Io) flows only in the LED 22, so that the LED array 21 is turned off and the LED 22 is turned on.

The transistor N5 functions as an open drain output stage that outputs the protect bus signal PBUS. The drain of the transistor N5 is connected to the PBUS pin. The source and the back gate of the transistor N5 are connected to the ground terminal. The transistor N5 is turned on when the gate signal input from the abnormality protector 117 is at a high level, and is turned off when the gate signal is at a low level. The protect bus signal PBUS has a low level ($\cong$GND) when the transistor N5 is turned on, and has a high level ($\cong$VDRV5) when the transistor N5 is turned off.

The LED driver IC 11 configured as described above performs an output feedback control of the output current Io with a bottom detection on-time fixed method (=a method in which the DC/DC converter is turned on for the on-time Ton from a bottom detection timing of the output current Io, and then the DC/DC converter is turned off until the next bottom detection timing). Hereinafter, the configuration and operation of the current controller 112, which is a main part for performing such an output feedback control, will be described in detail.

<Current Controller>

Figure 8:
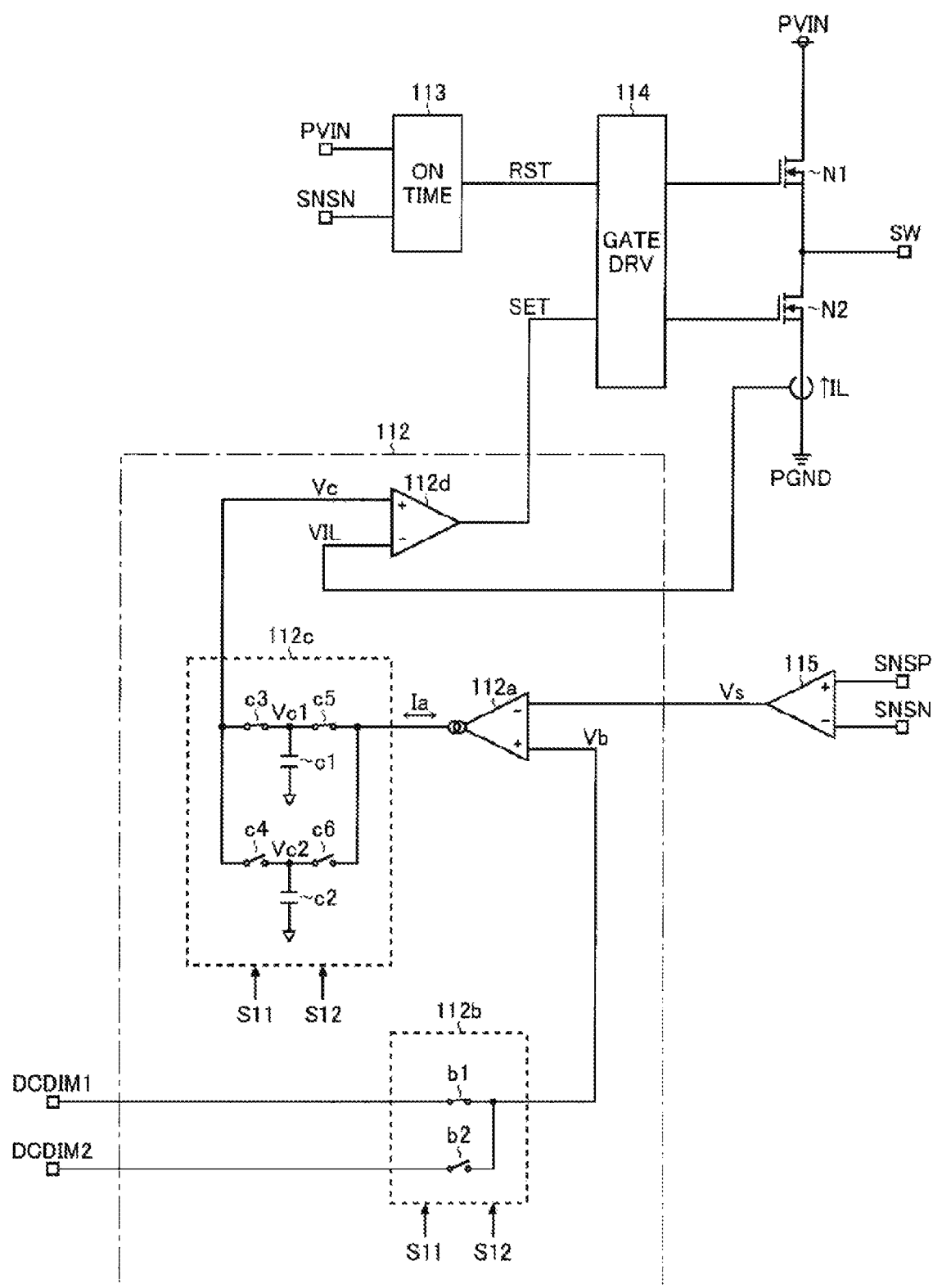
FIG. 8 is a view showing an exemplary configuration of a current controller.

FIG. 8 is a view showing an exemplary configuration of the current controller 112. The current controller 112 includes an error amplifier 112a, a dimming voltage switcher 112b, a threshold voltage generator 112c, and a comparator 112d.

The error amplifier 112a is a trans-conductance amplifier (so-called a gm amplifier), which amplifies a difference value Δ (=Vb−Vs) between the sense voltage Vs input to the inverting input terminal (−) and a dimming voltage Vb input to the non-inverting input terminal (+) to generate an error current Ia. The error current Ia flows in a positive direction (=a direction where the error current Ia flows from the error amplifier 112a toward the threshold voltage generator 112c) when Δ>0, and flows in a negative direction (=a direction where the error current Ia flows from the threshold voltage generator 112c toward the error amplifier 112a) when Δ<0. In addition, the current value of the error current Ia increases as |Δ| increases, and decreases as |Δ| decreases.

The dimming voltage switcher 112b includes a switch b1 connected between the DCDIM1 pin and the non-inverting input terminal (+) of the error amplifier 112a and a switch b2 connected between the DCDIM2 pin and the non-inverting input terminal (+) of the error amplifier 112a, and switches the dimming voltage Vb for each of the LED array 21 and the LED 22 based on the PWM dimming signals S11 and S12. Specifically, when the LED array 21 is turned on (S11=H, S12=L), the switch b1 is switched on and the switch b2 is switched off to select and output the DC dimming signal DCDIM1 as the dimming voltage Vb. On the other hand, when the LED 22 is turned on (S11=L, S12=H), the switch b1 is switched off and the switch b2 is switched on to select and output the DC dimming signal DCDIM2 as the dimming voltage Vb.

The threshold voltage generator 112c includes capacitors c1 and c2 and switches c3 to c6. First ends of the switches c3 and c4 are connected to an application terminal of a threshold voltage Vc. A second end of the switch c3 is connected to a first end of the capacitor c1 (=corresponding to an application terminal of an integrated voltage Vc1) and a first end of the switch c5. A second end of the switch c4 is connected to a first end of the capacitor c2 (=corresponding to an application terminal of an integrated voltage Vc2) and a first end of the switch c6. Second ends of the capacitors c1 and c2 are connected to a constant potential terminal. Second ends of the switches c5 and c6 are connected to an output terminal of the error amplifier 112a.

The switches c3 and c5 are turned on and turned off according to the PWM dimming signal S11. More specifically, the switches c3 and c5 are turned on when S11=H, and are turned off when S11=L. On the other hand, the switches c4 and c6 are turned on and turned off according to the PWM dimming signal S12. More specifically, the switches c4 and c6 are turned on when S12=H, and are turned off when S12=L.

Accordingly, when the LED array 21 is turned on (S11=H, S12=L), the capacitor c1 is incorporated in the control loop to output the integrated voltage Vc1 as the threshold voltage Vc, and the capacitor c2 is disconnected from the control loop to hold the integrated voltage Vc2. On the other hand, when the LED 22 is turned on (S11=L, S12=H), the capacitor c2 is incorporated in the control loop to output the integrated voltage Vc2 as the threshold voltage Vc, and the capacitor c1 is disconnected from the control loop to hold the integrated voltage Vc1.

As described above, the threshold voltage generator 112c generates two integrated voltages Vc1 and Vc2 by integrating the error current Ia in a sequentially distributed manner while switching two integrators (=capacitors c1 and c2) connected to a subsequent stage of the error amplifier 112a in synchronization with the switching control of the dimming voltage Vb based on the PWM dimming signals S11 and S12, and outputs one of the integrated voltages Vc1 and Vc2 as the threshold voltage Vc.

The comparator 112d compares the slope voltage VIL input to the inverting input terminal (−) with the threshold voltage Vc input to the non-inverting input terminal (+) to generate the set signal SET. Therefore, the set signal SET has a low level when VIL>SET and has a high level when VIL<SET. The slope voltage VIL is a voltage signal corresponding to a lower inductor current IL flowing in the off-period (N1: off, N2: on) of the switch output stage. The threshold voltage Vc is switched for each of the LED array 21 and the LED 22 (for each of the target current values I1 and I2).

Figure 9:
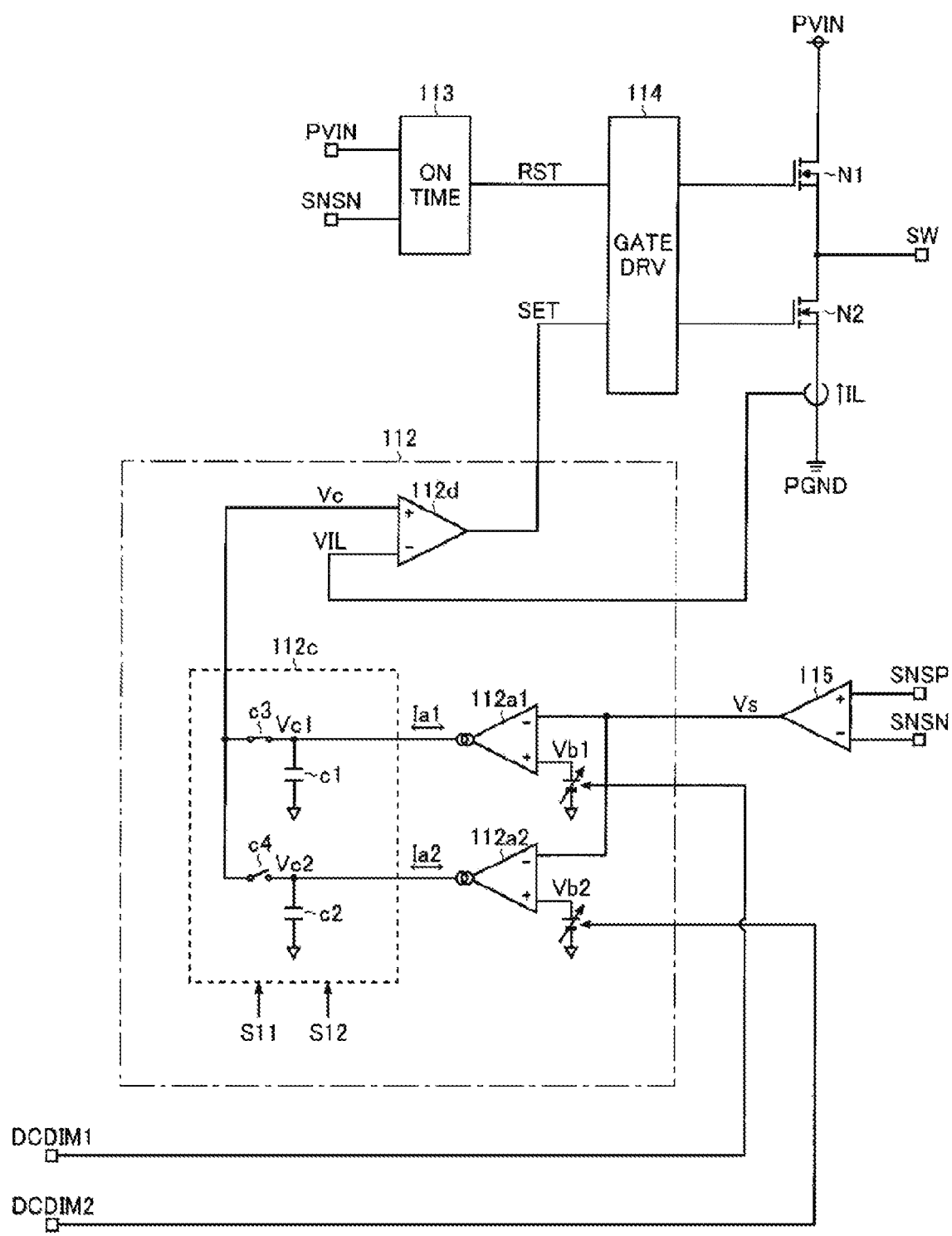
FIG. 9 is a view showing a modification of the current controller.

FIG. 9 is a view showing the current controller 112 according to a modification. In the current controller 112 of this modification, the dimming voltage switcher 112b is omitted and the single error amplifier 112a is replaced with two error amplifiers 112a1 and 112a2. In addition, with the above modification, the switches c5 and c6 of the threshold voltage generator 112c are removed.

The error amplifier 112a1 amplifies a difference value Δ1 (=Vb1−Vs) between the sense voltage Vs input to the inverting input terminal (−) and a dimming voltage Vb1 input to the non-inverting input terminal (+) to generate an error current Ia1. The error current Ia1 flows in the positive direction when Δ1>0, and flows in the negative direction when Δ1<0. In addition, the current value of the error current Ia1 increases as |Δ1| increases, and decreases as |Δ1| decreases. The dimming voltage Vb1 is arbitrarily set according to the DC dimming signal DCDIM1.

The error amplifier 112a2 amplifies a difference value Δ2 (=Vb2−Vs) between the sense voltage Vs input to the inverting input terminal (−) and a dimming voltage Vb2 input to the non-inverting input terminal (+) to generate the error current Ia2. The error current Ia2 flows in the positive direction when Δ2>0, and flows in the negative direction when Δ2<0. In addition, the current value of the error current Ia2 increases as |Δ2| increases, and decreases as |Δ2| decreases. The dimming voltage Vb2 is arbitrarily set according to the DC dimming signal DCDIM2.

The output terminals of the error amplifiers 112a1 and 112a2 are directly connected to the first ends of the capacitors c1 and c2, respectively. Therefore, the threshold voltage generator 112c generates two integrated voltages Vc1 and Vc2 by integrating two error currents Ia1 and Ia2 in parallel by using two integrators (=capacitors c1 and c2) connected to the respective subsequent stages of the error amplifiers 112a1 and 112a2, and outputs one of the integrated voltages Vc1 and Vc2 as the threshold voltage Vc.

As described above, various modifications can be considered for the configuration of the current controller 112. For example, the error current Ia (or Ia1 and Ia2) may be converted into a digital signal using an AD converter, and all subsequent signal processing (integration processing or a threshold value switching processing) may be implemented digitally.

Figure 10:
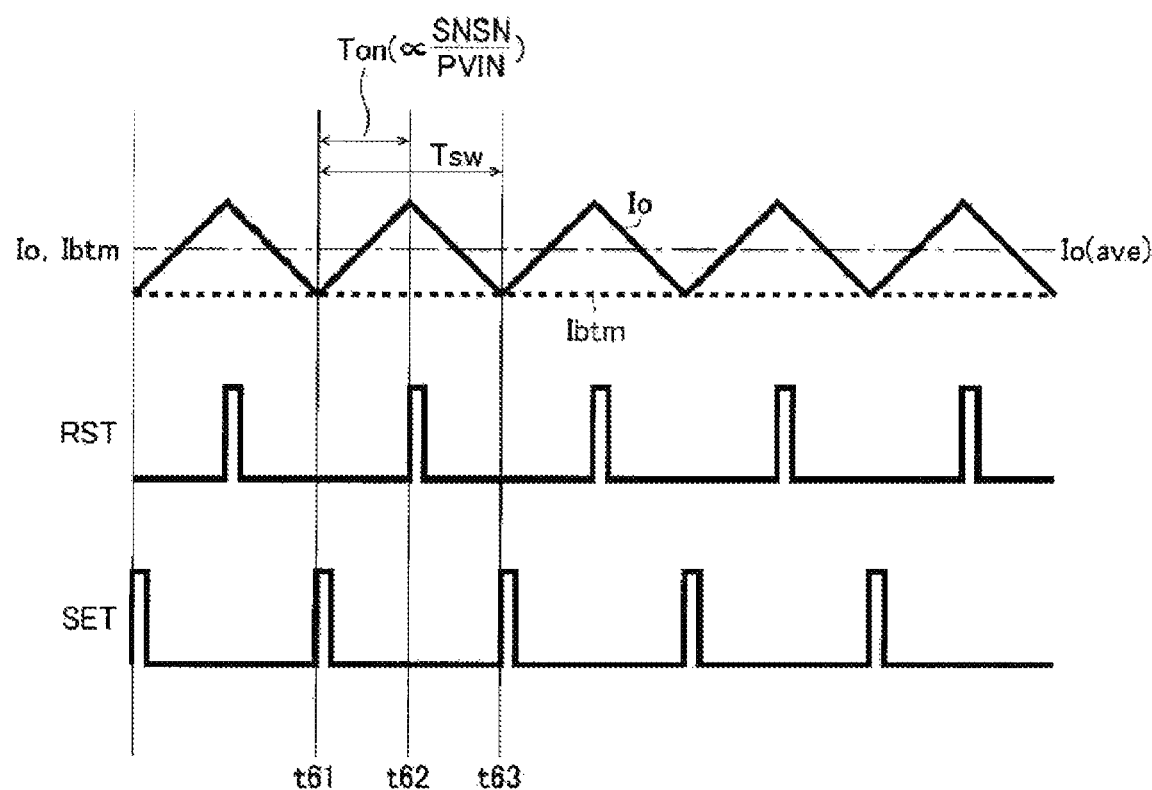
FIG. 10 is a view showing an example of a current stabilization control and a frequency stabilization control in the second embodiment.

FIG. 10 is a view showing an example of a current stabilization control and a frequency stabilization control in a second embodiment, and depicts the output current Io (solid line), a bottom detection value Ibtm (broken line), the reset signal RST, and the set signal SET in order from the top.

At time t61, when the pulse output of the set signal SET is performed, since the transistor N1 is turned on and the transistor N2 is turned off, the output current Io starts to increase.

At time t62, when the on-time Ton has elapsed from the pulse output of the set signal SET and the pulse output of the reset signal RST is performed, since the transistor N1 is turned off and the transistor N2 is turned on, the output current Io turns from increasing to decreasing.

At time t63, when the output current Io falls below the bottom detection value Ibtm and the pulse output of the set signal SET is performed, since the transistor N1 is turned on and the transistor N2 is turned off, the output current Io turns from decreasing to increasing. After time t63, the same operation as described above is repeated.

The above-described bottom detection processing of the output current Io (=a comparison processing of the output current Io with the bottom detection value Ibtm) is equivalent to a comparison processing of the slope voltage VIL with the threshold voltage Vc in the current controller 112 (in particular, in the comparator 112d).

Here, the current controller 112 adjusts and controls the threshold voltage Vc (and thus the bottom detection value Ibtm) so as to stabilize an average output current Io(ave) (=an average value of output current Io) to the target current value. More specifically, the current controller 112 integrates a difference value Δ between the sense voltage Vs (=corresponding to the output current Io) and the dimming voltage Vb (=corresponding to the target current value) to generate the threshold voltage Vc.

Accordingly, the threshold voltage Vc (thus the bottom detection value Ibtm) increases when the average output current Io(ave) is lower than the target current value, and decreases when the average output current Io(ave) is higher than the target current value. As the threshold voltage Vc increases, the pulse generation timing of the set signal SET becomes earlier, so that the off-period of the switch output stage is shortened and the output current Io is increased. On the contrary, as the threshold voltage Vc decreases, the pulse generation timing of the set signal SET becomes later, so that the off-period of the switch output stage is lengthened and the output current Io is decreased.

According to the series of operations described above, it is possible to stabilize the average output current Io(ave) to the target current value with higher accuracy as compared with the above-described hysteresis control method.

In addition, as described above, the on-time Ton is a variable value (Ton∝SNSN/PVIN), which is proportion to the output voltage Vo (in particular, the SNSN pin voltage applied to the LED light emitter 20) and is inversely proportional to the input voltage PVIN. Accordingly, when the output voltage Vo (=SNSN) increases due to the change in the number of lights accompanying the time division control of the LED array 21 and the LED 22, the on-time Ton becomes longer according to the increase. Conversely, when the output voltage Vo (=SNSN) decreases, the on-time Ton becomes shorter according to the decrease.

It is noted that the switching cycle Tsw of a buck DC/DC converter is represented by Tsw=Ton×(PVIN/SNSN). Accordingly, as described above, by variably controlling the on-time Ton, the switching cycle Tsw (and thus the switching frequency fsw) can be stabilized at a constant value, which facilitates EMC countermeasures.

Figure 11:
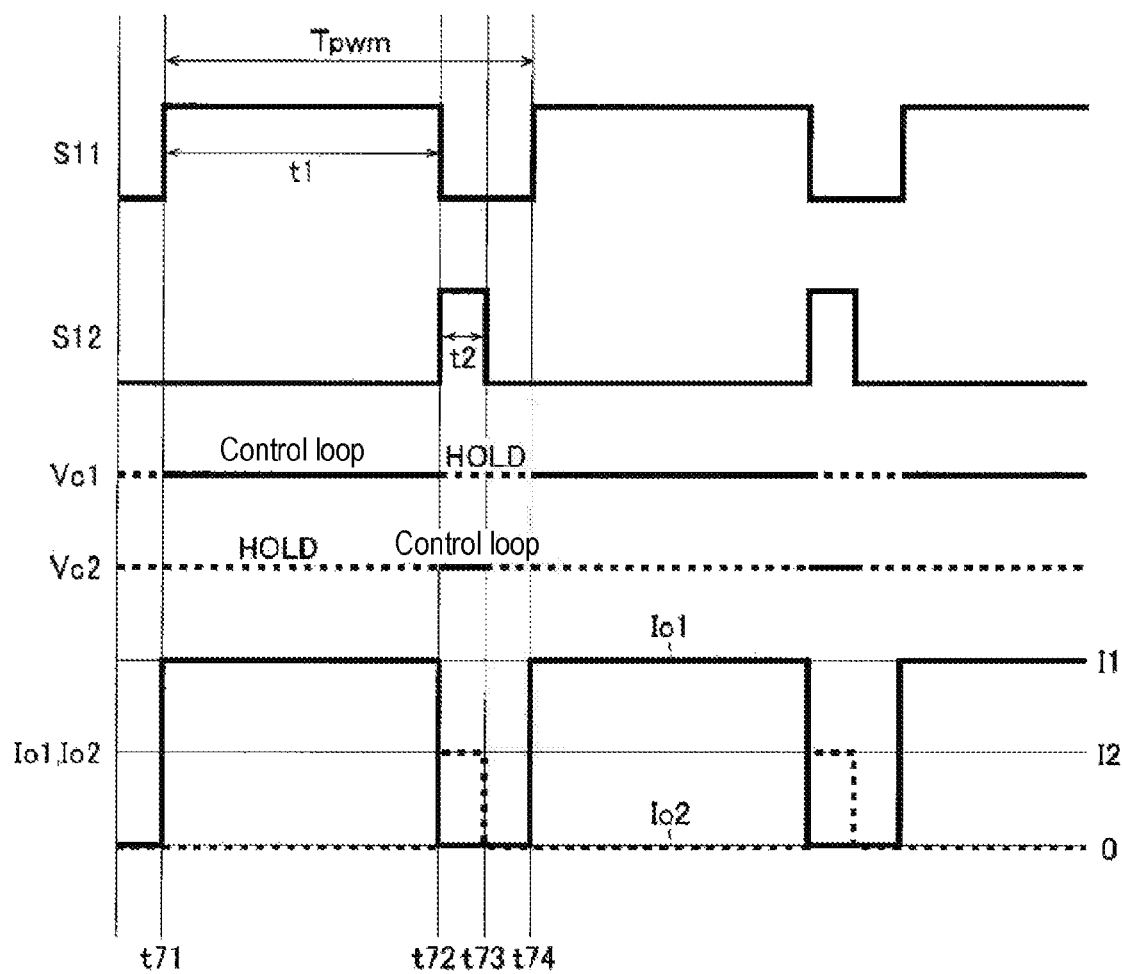
FIG. 11 is a view showing an example of a time division control in the second embodiment.

FIG. 11 is a view showing an example of a time division control in the second embodiment, and depicts PWM dimming signals S11 and S12, integrated voltages Vc1 and Vc2, and output currents Io1 (solid line) and Io2 (broken line) in order from the top.

During a period t1 (time t71 to time t72), the PWM dimming signal S11 is at a high level and the PWM dimming signal S12 is at a low level, so that the LED array 21 is turned on and the LED 22 is turned off. At this time, in the threshold voltage generator 112c, the capacitor c1 is incorporated in the control loop to output the integrated voltage Vc1 as the threshold voltage Vc, and the capacitor c2 is disconnected from the control loop to hold the integrated voltage Vc2. Accordingly, the output current Io1 (=Io) flowing through the LED array 21 is stabilized at the target current value I1 according to the DC dimming signal DCDIM1.

On the other hand, during a period t2 (time t72 to time t73), the PWM dimming signal S11 is at a low level and the PWM dimming signal S12 is at a high level, so that the LED array 21 is turned off and the LED 22 is turned on. At this time, in the threshold voltage generator 112c, the capacitor c2 is incorporated in the control loop to output the integrated voltage Vc2 as the threshold voltage Vc, and the capacitor c1 is disconnected from the control loop to hold the integrated voltage Vc1. Accordingly, the output current Io2 (=Io) flowing through the LED 22 is stabilized at the target current value I2 according to the DC dimming signal DCDIM2.

In addition, during a period t3 (time t73 to time t74), both of the PWM dimming signals S11 and S12 are at a low level, so that neither of the output currents Io1 and Io2 flows and both the LED array 21 and the LED 22 are turned off. At this time, in the threshold voltage generator 112c, both of the capacitors c1 and c2 are disconnected from the control loop to hold both of the integrated voltages Vc1 and Vc2. In this way, a relationship of t1+t2<Tsw may be established between the periods t1 and t2 and the switching cycle Tsw. That is, although simultaneous turning-on of the LED array 21 and the LED 22 is not accepted, simultaneous turning-off thereof may be allowed.

However, as described above, the LED array 21 and the LED 22 are alternately turned on and off when viewed microscopically, but when the switching cycle Tsw is sufficiently short, the LED array 21 and the LED 22 appear to be turned on simultaneously to the naked human eye.

As described above, according to the LED driver IC 11 of the present embodiment, by generating the single output current Io while switching the target current value for each of the LED array 21 and the LED 22, and supplying the single output current Io to each of the LED array 21 and the LED 22 in a time division manner, it is possible to dim the LED array 21 and the LED 22 individually.

In particular, since the LED driver IC 11 of the present embodiment performs the output feedback control of the output current Io by the bottom detection on-time fixed method, a smaller output capacitor (=capacitor C4) can be used as compared with the above-described error amplifier control method. Therefore, even when the number of lights changes at a high speed during the time division control of the LED array 21 and the LED 22, since a large rush current does not flow, the output current Io is unlikely to enter the overcurrent state or the reduced current state. This advantage is similar to the above-described hysteresis control method.

In addition, in the LED driver IC 11 of the present embodiment, since the bottom detection value Ibtm (=threshold voltage Vc) is adjusted by using the error amplifier 112*a*, it is possible to realize a current stabilization control with higher accuracy as compared with the above-described hysteresis control method.

Third Embodiment

Figure 12:
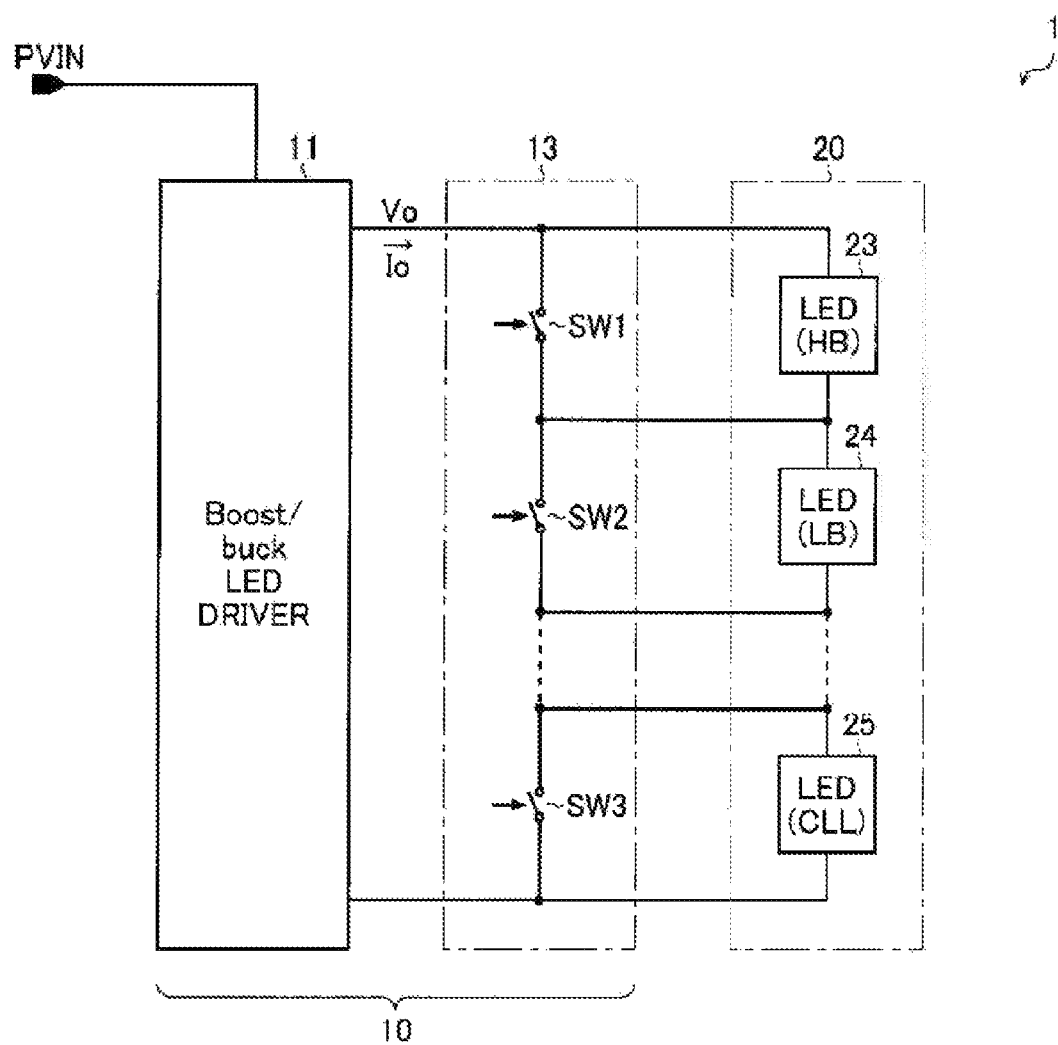
FIG. 12 is a view showing an LED light emitting device according to a third embodiment.

FIG. 12 is a view showing an LED light emitting device according to a third embodiment. In the LED light emitting device 1 of the present embodiment, unlike the first embodiment (FIG. 1) or the second embodiment (FIG. 7) described above, LEDs (or LED arrays) 23 to 25 forming the LED light emitter 20 are connected in series. In the following description, it is assumed that the LED light emitter 20 is an LED headlamp of a vehicle, and in particular, the LED 23 is a high beam, the LED 24 is a low beam, and the LED 25 is a clearance lamp (a vehicle width light).

In addition, switches SW1 to SW3 forming the time division controller 13 are connected in parallel to the LEDs 23 to 25, respectively, in accordance with a change in the configuration of the LED light emitter 20. Accordingly, for example, when only the switch SW1 is switched off and all the other switches are switched on, the output current Io flows only into the LED 23. Similarly, when only the switch SW2 is switched off, the output current Io flows only in the LED 24, and when only the switch SW3 is switched off, the output current Io flows only in the LED 25. The time division controller 13 configured as above can be implemented using, for example, an LCM [Light Control Module].

In the LED light emitter 20, LEDs other than the LEDs 23 to 25 may be connected in series. In that case, it is also assumed that a plurality of switches connected in parallel to respective LEDs are switched off at the same time so that the output current Io flows into the plurality of LEDs. At this time, when the output voltage Vo higher than the voltage PVIN input to the LED driver IC 11 is required, a boost DC/DC converter may be incorporated in the LED driver IC 11.

In general, it is necessary to turn on the high beam (LED 23) or the low beam (LED 24) and the clearance lamp (LED 25) at the same time at night or in a tunnel when or where the surroundings of a vehicle are dark. In this case, for example, when the switch SW1 is switched on and the switches SW2 and SW3 are switched off, since the common output current Io flows to the LEDs 24 and 25, the LEDs 24 and 25 can be turned on at the same time. However, the LEDs 24 and 25 cannot be dimmed individually.

On the other hand, when the above-described time division control is applied, it is possible to individually dim each of the LEDs 23 to 25. Hereinafter, a specific description will be given with reference to the drawings.

Figure 13:
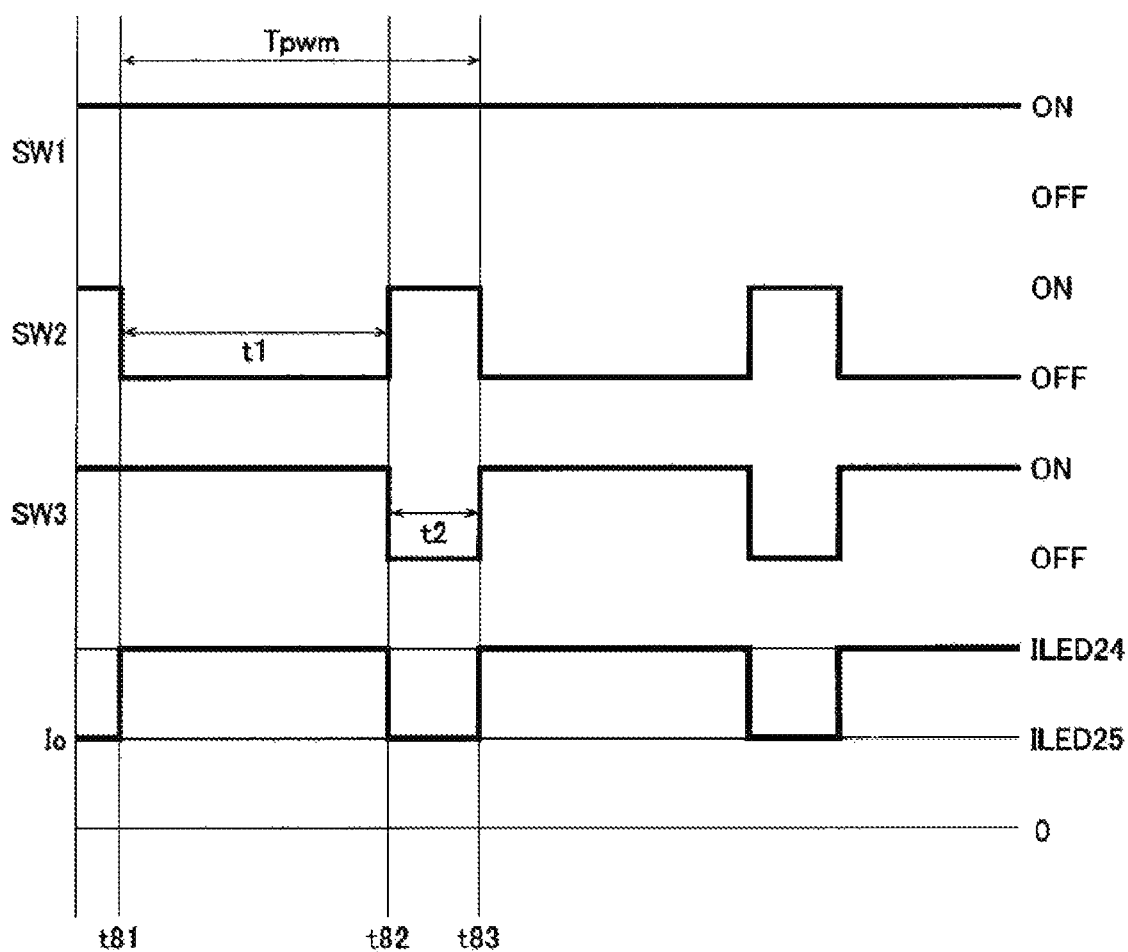
FIG. 13 is a view showing an example of a time division control in the third embodiment.

FIG. 13 is a view showing an example of a time division control in the third embodiment, and depicts the on and off states of the switches SW1 to SW3 and the output current Io in order from the top.

During a period t1 (time t81 to time t82), since the switches SW1 and SW3 are switched on and the switch SW2 is switched off, only the LED 24 is turned on and the LEDs 23 and 25 are turned off. At this time, the output current Io flowing into the LED 24 is stabilized at a target current value ILED24 for the LED 24. As a result, the low beam of the vehicle is turned on with a desired brightness.

On the other hand, during a period t2 (time t82 to time t83), since the switches SW1 and SW2 are switched on and the switch SW3 is switched off, only the LED 25 is turned on and the LEDs 23 and 24 are turned off. At this time, the output current Io flowing into the LED 25 is stabilized at a target current value ILED25 for the LED 25. As a result, the clearance lamp of the vehicle is turned on with a desired brightness.

The LEDs 24 and 25 repeatedly and alternately turn on and off when viewed microscopically. However, when the switching cycle Tsw is sufficiently short, the LEDs 24 and 25 appear to be simultaneously turned on to the naked human eye.

As described above, according to the LED driver IC 11 of the present embodiment, it is possible to individually dim the LEDs 23 to 25 by generating the single output current Io while switching the target current value for each of the LEDs 23 to 25 and supplying the single output current Io to each of the LEDs 23 to 25 in a time division manner.

<Application to Vehicle>

Figure 14:
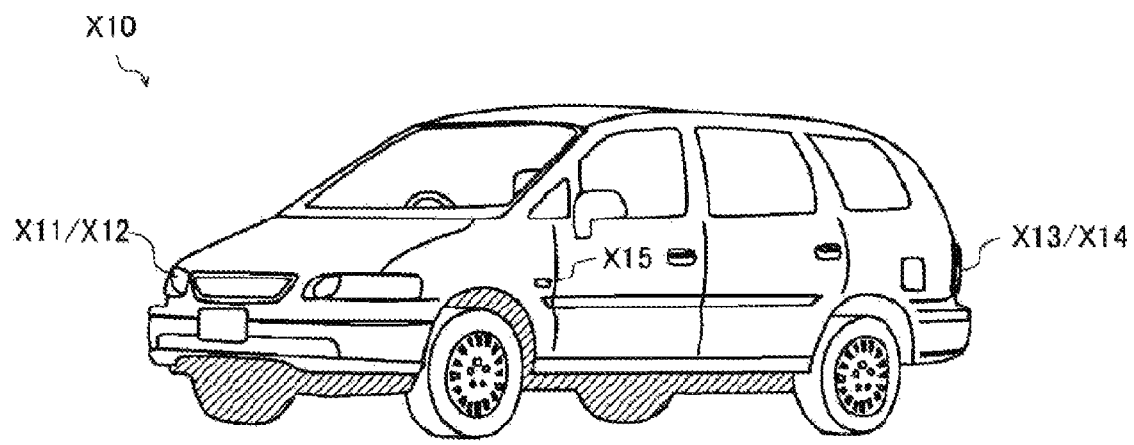
FIG. 14 is a view (front view) showing an external appearance of a vehicle equipped with an LED light emitting device.
Figure 15:
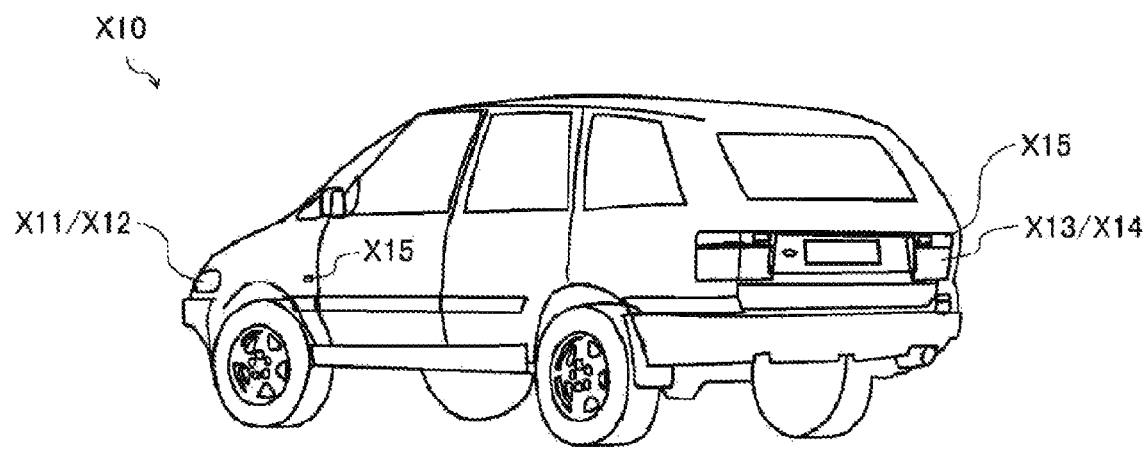
FIG. 15 is a view (rear view) showing an external appearance of the vehicle equipped with the LED light emitting device.

The LED light emitting device 1 described so far can be suitably used as an exterior lamp of a vehicle X10. As shown in FIGS. 14 and 15, examples of the exterior lamp of the vehicle X10 may include a headlamps (including a high beam, low beam, small lamp, fog lamp, clearance lamp, and the like) X11, a daylight running lamps (DRL) X12, a tail lamp (including a small lamp, back lamp, and the like) X13, a stop lamp X14, a turn lamp X15, and the like.

Figure 16:
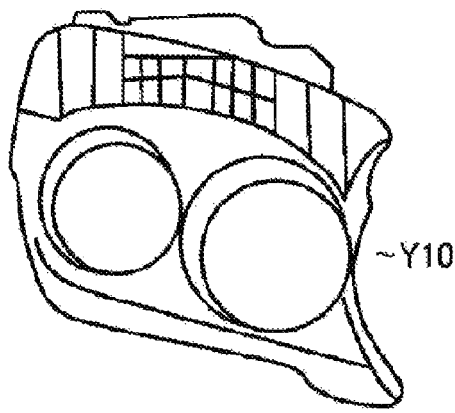
FIG. 16 is a view showing an external appearance of an LED head lamp module.
Figure 17:
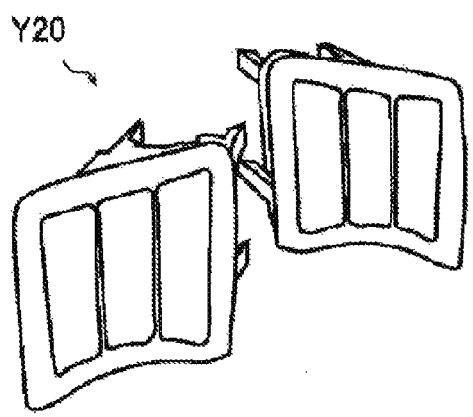
FIG. 17 is a view showing an external appearance of an LED turn lamp module.
Figure 18:
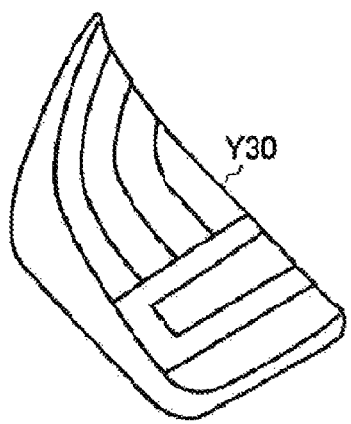
FIG. 18 is a view showing an external appearance of an LED rear lamp module.

The LED driver IC 11 is provided as a module (such as an LED headlamp module Y10 in FIG. 16, an LED turn lamp module Y20 in FIG. 17, or an LED rear lamp module Y30 in FIG. 18) together with the LED light emitter 20. Alternatively, the LED driver IC 11 may be provided as an IC unit independently of the LED light emitter 20.

<Other Modifications>

In the above embodiments, the configuration using the light emitting diode or the light emitting diode array as the light emitting element has been described as an example, but the light emitting element is not limited thereto. For example, it is also possible to use an organic EL element or an organic EL element array.

Industrial Availability

The present disclosure can be applied to, for example, exterior lamps (DRLs, position lamps, turn lamps, rear lamps, clearance lamps, and the like) of a vehicle.

According to the present disclosure in some embodiments, it is possible to provide a light emitting element drive device capable of individually dimming a plurality of light emitting elements with a small number of components.

While certain embodiments have been described, these embodiments have been presented by way of example only, and are not intended to limit the scope of the disclosures.

Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A light emitting element drive device operable to generate a single output current while switching a target current value for each of a plurality of light emitting elements and operable to supply the single output current to the plurality of light emitting elements in a time division manner,
   wherein an output feedback control of the output current is performed by a bottom detection on-time fixed method, and
   wherein the light emitting element drive device comprises:
      a current controller configured to output a pulse of a set signal when detecting a bottom of the output current;
      an on-time setter configured to output a pulse of a reset signal when an on-time has elapsed from the pulse output of the set signal; and
      a switch driver configured to generate the output current by driving a switch output stage according to the set signal and the reset signal.

2. The light emitting element drive device of claim 1, wherein an output feedback control of the output current is performed by a hysteresis control method.

3. The light emitting element drive device of claim 1, wherein the current controller includes a comparator configured to compare a slope voltage according to an inductor current flowing in an off-period of the switch output stage with a threshold voltage that is switched for each of the plurality of light emitting elements to generate the set signal.

4. The light emitting element drive device of claim 3, wherein the current controller performs an adjustment control of the threshold voltage so as to stabilize an average value of the output current at the target current value.

5. The light emitting element drive device of claim 4, wherein the current controller further includes:
      an error amplifier configured to amplify a difference between a sense voltage according to the output current and a predetermined dimming voltage to generate an error signal;
      a dimming voltage switcher configured to switch the dimming voltage for each of the plurality of light emitting elements; and
      a threshold voltage generator configured to generate a plurality of integrated voltages by integrating the error signal in a sequentially distributed manner while switching a plurality of integrators connected to a subsequent stage of the error amplifier in synchronization with a switching control of the dimming voltage, and configured to output one of the plurality of integrated voltages as the threshold voltage.

6. The light emitting element drive device of claim 4, wherein the current controller further includes:
      a plurality of error amplifiers configured to amplify differences between a sense voltage according to the output current and a plurality of dimming voltages, respectively, to generate a plurality of error signals; and
      a threshold voltage generator configured to generate a plurality of integrated voltages by integrating the plurality of error signals in parallel using a plurality of integrators connected to subsequent stages of the plurality of error amplifiers, respectively, and configured to output one of the plurality of integrated voltages as the threshold voltage.

7. The light emitting element drive device of claim 1, wherein the on-time is a variable value proportional to an output voltage applied to the plurality of light emitting elements.

8. A light emitting device comprising:
   the light emitting element drive device of claim 1; and
   a plurality of light emitting elements driven by the light emitting element drive device.

9. The light emitting device of claim 8, wherein the light emitting element is a light emitting diode or a light emitting diode array, or an organic electro-luminescence (EL) element or an organic EL element array.

10. A vehicle comprising the light emitting device of claim 8 as an exterior lamp.

* * * * *